United States Patent
Leddige et al.

(10) Patent No.: US 10,078,612 B2
(45) Date of Patent: Sep. 18, 2018

(54) MODE SELECTIVE BALANCED ENCODED INTERCONNECT

(71) Applicant: INTEL CORPORATION, Santa Clara, CA (US)

(72) Inventors: Michael W. Leddige, Beaverton, OR (US); Stephen H. Hall, Forest Grove, OR (US); Chaitanya Sreerama, Hillsboro, OR (US); Olufemi B. Oluwafemi, Hillsboro, OR (US); Antonio Zenteno Ramirez, Guadalajara (MX); Maynard C. Falconer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 373 days.

(21) Appl. No.: 14/444,616

(22) Filed: Jul. 28, 2014

(65) Prior Publication Data

US 2016/0026597 A1    Jan. 28, 2016

(51) Int. Cl.
  *G06F 13/36*   (2006.01)
  *G06F 13/42*   (2006.01)
  *G06F 13/20*   (2006.01)

(52) U.S. Cl.
  CPC .......... *G06F 13/4221* (2013.01); *G06F 13/20* (2013.01)

(58) Field of Classification Search
  CPC ................................... G06F 13/4221
  USPC ....................................... 710/308
  See application file for complete search history.

(56) References Cited

U.S. PATENT DOCUMENTS

| | | | | |
|---|---|---|---|---|
| 3,082,296 A | * | 3/1963 | Caruthers | H04B 1/68 370/206 |
| 3,652,802 A | * | 3/1972 | Schellenberg | H04L 12/525 370/505 |
| 4,298,959 A | * | 11/1981 | Sundermeyer | G06F 13/28 710/22 |
| 4,328,577 A | * | 5/1982 | Abbott | H04J 3/14 370/228 |
| 4,685,101 A | * | 8/1987 | Segal | H04J 3/1641 370/468 |
| 4,837,786 A | * | 6/1989 | Gurantz | H04B 1/707 370/206 |
| 5,102,353 A | * | 4/1992 | Brunker | H01R 13/6594 439/108 |

(Continued)

FOREIGN PATENT DOCUMENTS

| CN | 1423179 A | 6/2003 |
|---|---|---|
| CN | 1641618 A | 7/2005 |

(Continued)

OTHER PUBLICATIONS

TW Search Report, TW Application No. 104118787, dated May 3, 2016, 1 page.

(Continued)

*Primary Examiner* — Paul R Myers
(74) *Attorney, Agent, or Firm* — International IP Law Group P.L.L.C.

(57) ABSTRACT

An apparatus is described herein. The apparatus includes a plurality of conductors, wherein at least one conductor is a common-mode conductor. The apparatus also includes an encoder to encode data to be transmitted on the plurality of conductors, wherein a data speed of the common-mode conductor is limited and a data speed of other conductors is maximized according to an encoding matrix.

24 Claims, 15 Drawing Sheets

(56) References Cited

U.S. PATENT DOCUMENTS

| | | | |
|---|---|---|---|
| 5,172,415 A * | 12/1992 | Fosgate | H04S 5/005 381/22 |
| 5,920,552 A * | 7/1999 | Allpress | H04B 7/264 370/209 |
| 6,624,873 B1 * | 9/2003 | Callahan, Jr. | H04S 3/02 352/11 |
| 6,697,491 B1 * | 2/2004 | Griesinger | H04S 3/02 381/18 |
| 9,268,683 B1 * | 2/2016 | Cronie | G11C 11/565 |
| 2002/0087820 A1 * | 7/2002 | Garlepp | G06F 13/1689 711/167 |
| 2002/0104054 A1 | 8/2002 | Shin | |
| 2003/0088317 A1 | 5/2003 | Sessions et al. | |
| 2005/0036524 A1 * | 2/2005 | Wojtowicz | H04J 3/04 370/537 |
| 2006/0171217 A1 * | 8/2006 | Ward | H04L 43/00 365/200 |
| 2007/0058744 A1 * | 3/2007 | Amirkhany | G06J 1/005 375/260 |
| 2009/0080881 A1 * | 3/2009 | Yokoyama | H04J 14/0227 398/16 |
| 2009/0222226 A1 * | 9/2009 | Baraniuk | H03M 13/11 702/66 |
| 2010/0189186 A1 * | 7/2010 | Zerbe | H04B 3/32 375/257 |
| 2010/0269009 A1 | 10/2010 | Okamura et al. | |
| 2011/0320906 A1 | 12/2011 | Murakami et al. | |
| 2012/0308016 A1 * | 12/2012 | Van Dongen | G10L 19/008 381/22 |
| 2014/0181357 A1 | 6/2014 | Hall et al. | |
| 2014/0281154 A1 * | 9/2014 | Hashimoto | G11C 29/1201 711/103 |

FOREIGN PATENT DOCUMENTS

| | | | | |
|---|---|---|---|---|
| CN | 101499048 A | | 8/2009 | |
| WO | WO 9016121 A1 * | 12/1990 | | H04Q 11/04 |
| WO | WO 9736408 A2 * | 10/1997 | | H04L 25/03866 |

OTHER PUBLICATIONS

CN Search Report, CN Application No. 201510450907.2, dated Sep. 4, 2017, 1 page.

* cited by examiner

300

400

$$W = \begin{array}{|c|c|c|c|} \hline W_{1,1} & W_{1,2} & W_{1,3} & W_{1,4} \\ \hline W_{2,1} & W_{2,2} & W_{2,3} & W_{2,4} \\ \hline W_{3,1} & W_{3,2} & W_{3,3} & W_{3,4} \\ \hline W_{4,1} & W_{4,2} & W_{4,3} & W_{4,4} \\ \hline \end{array}$$

500
FIG. 5A $$W = \begin{array}{|c|c|c|c|} \hline 1 & -1 & 1 & 1 \\ \hline 1 & -1 & -1 & -1 \\ \hline 1 & 1 & -1 & 1 \\ \hline 1 & 1 & 1 & -1 \\ \hline \end{array}$$

$$\mathbf{I} \equiv W^{-1} \equiv \begin{array}{|c|c|c|c|} \hline I_{1,1} & I_{1,2} & \cdots & I_{1,N} \\ \hline I_{2,1} & I_{2,2} & \cdots & I_{2,N} \\ \hline \vdots & \vdots & \ddots & \vdots \\ \hline I_{N,1} & I_{N,2} & \cdots & I_{N,N} \\ \hline \end{array}$$

700

FIG. 7A $$\mathbf{I} \equiv \begin{array}{|c|c|c|c|} \hline 0.25 & 0.25 & 0.25 & 0.25 \\ \hline -0.25 & -0.25 & 0.25 & 0.25 \\ \hline 0.25 & -0.25 & -0.25 & 0.25 \\ \hline 0.25 & -0.25 & 0.25 & -0.25 \\ \hline \end{array}$$

MODE SELECTIVE BALANCED ENCODED INTERCONNECT

TECHNICAL FIELD

This present technique relates generally to techniques for reducing crosstalk between signal lines in a computing device. More specifically, the disclosure describes encoding techniques that takes advantage of crosstalk between the signal lines of a data bus with maximum bandwidth.

BACKGROUND ART

Modern computing devices continue to incorporate a growing number of components into smaller device chassis. As chassis volumes are decreased, the routing density of the data busses between components increases, which results in corresponding increases in crosstalk noise between the signal lines of the data bus. Crosstalk tends to reduce bus performance, which tends to limit the data rate at which a data bus can successfully transfer data between components. One way of reducing crosstalk in a data bus is to increase the signal line spacing, which limits the degree of miniaturization that can be achieved.

BRIEF DESCRIPTION OF THE DRAWINGS

FIG. 5A is an encoding matrix, W, used by a four-input encoder;

FIG. 5B is a is an example of an encoding matrix for a four-input encoder;

FIG. 7A is decoding matrix, I, used by an N-input encoder, where N corresponds to the number of signal lines coupled to the decoder;

FIG. 7B is an example of a decoding matrix for a four-input decoder;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
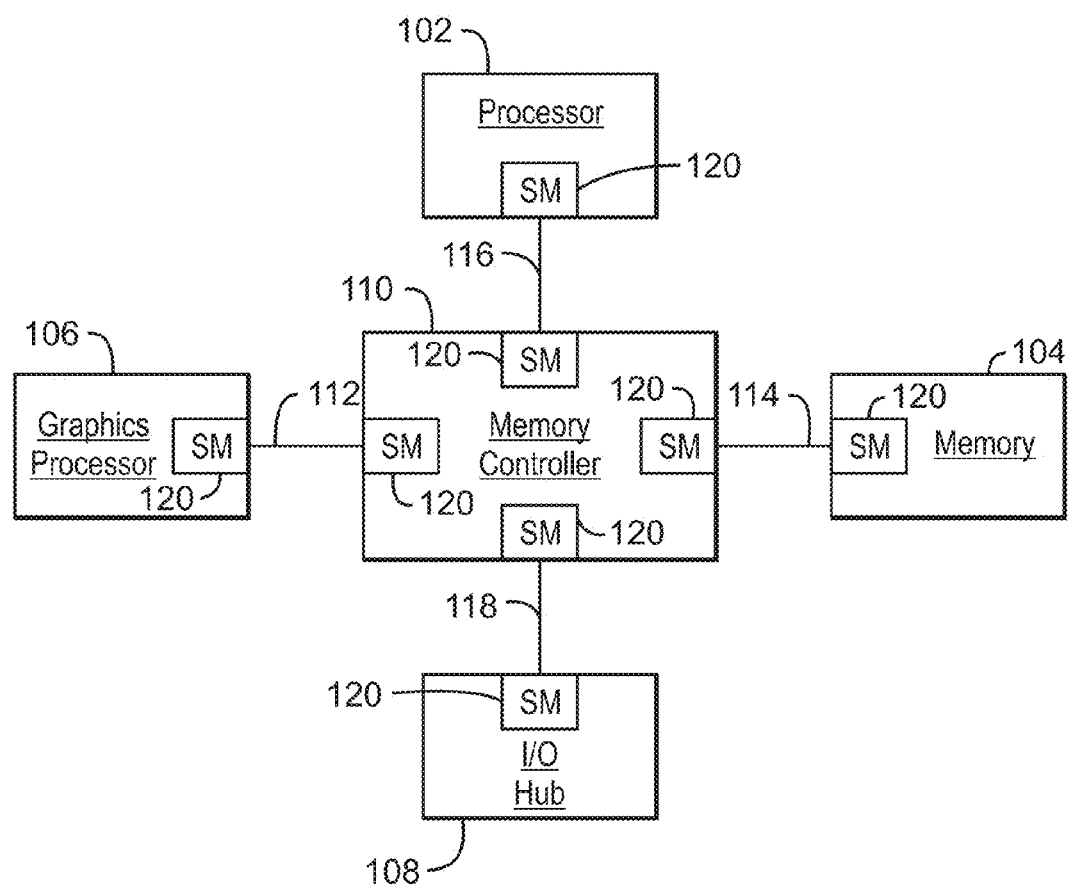
FIG. 1 is a block diagram of an example of a computing system with a signaling module that reduces crosstalk.

The subject matter disclosed herein relates to signaling techniques for transmitting information between components in a digital system, such as a memory bus on a motherboard, for example. Each of the components can include an Input/Output (I/O) transmitter with an encoding block and an I/O receiver with a decoding block. The data sent between the components is encoded and decoded such that the negative effects of crosstalk are removed and signal quality is enhanced. The signaling techniques disclosed herein provide significant increases in both routing density and bus speeds on packages, printed circuit boards (PCBs), multi-chip modules (MCMs) and multi-chip packages (MCPs). Increasing the routing density and bus speed enables more functionality to be designed into a smaller volume and helps facilitate the scaling of computer performance in accordance with Moore's Law.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present techniques. It will be apparent, however, to one skilled in the art that these specific details need not be employed to practice the present techniques. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present techniques.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the techniques described herein.

FIG. 1 is a block diagram of an example of a computing system than can enable a mode selective encoded interconnect. The computing system 100 may be, for example, a mobile phone, laptop computer, Ultrabook, desktop computer, server, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store computer-readable instructions that, when executed by the processor, direct the processor to perform various operations in accordance with embodiments described herein.

The computing system 100 may also include a graphics processor 106 that processes computer generated graphics. The graphics processor 106 is configured to process memory related to the generation of graphics to be sent to a display (not shown). The display may be a built-in component of the computing system 100 externally connected to the computing system 100. The computing system 100 can also include an I/O hub 108 used to connect and control additional I/O devices (not shown), such as network interface controllers, memory storage devices, user input devices, among others. The I/O devices coupled to the I/O hub 108 may be built-in components of the computing system 100, or may be devices that are externally connected to the computing system 100.

The computing system 100 may also include a memory controller hub 110 that handles communications between the processor 102, memory 104, graphics processor 106, and I/O hub 108. Communications between the various components of the computing system 100 can be performed over various data buses. For example, the graphics processor 106 can be coupled to the memory controller 110 through a graphics bus 112. The memory 104 can be coupled to the memory controller 110 through a memory bus 114. The data bus between the processor 102 and the memory controller 110 may be referred to as the front side bus 116. The data bus between the memory controller 110 and the I/O hub 108 may be referred to as the internal bus 118.

In some embodiments, the processor 102, graphics processor 106, memory device 104, memory controller 110, and I/O hub 108 may be separate integrated circuit chips coupled to a mother board. In some embodiments, one or more of the processor 102, graphics processor 106, memory device 104, memory controller 110, and I/O hub 108 may be included in a multi-chip module (MCM), multi-chip package (MCP), or system-on-a-chip (SOC). Depending on the design considerations of a particular implementation, the signal lines of the one or more of the busses 112, 114, 116, 118 may disposed, at least in part, on one or more circuit boards.

The computing system 100 also includes signaling modules 120 that facilitate digital communications between the components coupled to the respective bus. Each signaling module 120 receives a digital signal and generates voltage signals that propagate on the signal lines of the various busses. As explained further below, the voltage signals are encoded by the signaling module in a way that reduces the effects of crosstalk between the signal lines of the data bus. A respective signaling module 120 may be coupled to or included in any component of the computing device 100 that transmits data over a data bus that uses single-ended communications. For example, signaling modules may be included in the processor 102, graphics processor 106, memory device 104, memory controller 110, and I/O hub 108, among others.

It is to be understood that the block diagram of FIG. 1 is not intended to indicate that the computing system 100 is to include all of the components shown in FIG. 1. Rather, the computing system 100 can include fewer or additional components not illustrated in FIG. 1. Furthermore, the components may be coupled to one another according to any suitable system architecture, including the system architecture shown in FIG. 1 or any other suitable system architecture that uses a data bus to facilitate single-ended communications between components. For example, embodiments of the present techniques can also be implemented any suitable electronic device, including ultra-compact form factor devices, such as System-On-a-Chip (SOC) and multi-chip modules. It could also be used on any electrical cable inside or outside of a computer that is used to carry digital information from one point to another. For example, embodiments of the present techniques may be used for connecting disk drives.

Figure 2:
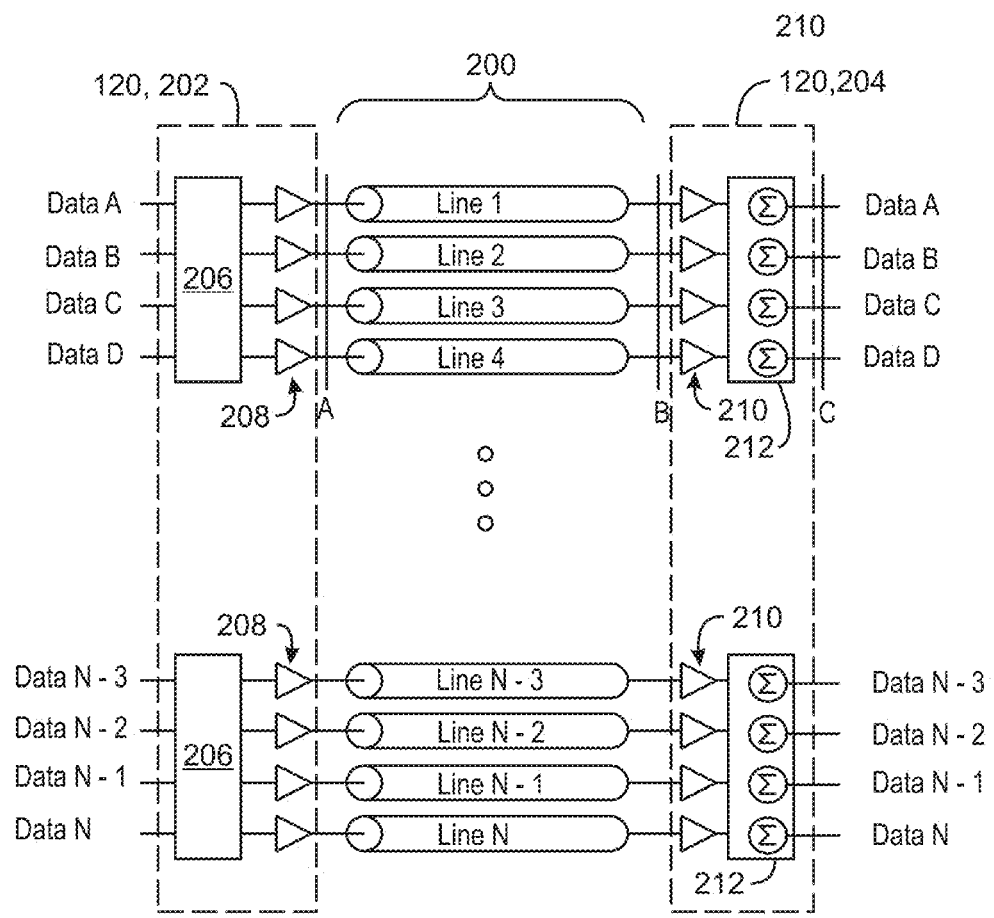
FIG. 2 is a block diagram showing an example of pair of signaling modules at the driving and receiving end of a bus.

FIG. 2 is a block diagram showing an example of pair of signaling modules at the driving and receiving end of a bus. Specifically, FIG. 2 shows two signaling modules 120 communicatively coupled through a data bus 200 comprising N signal lines, where N can be any suitable number, including but not limited to 2, 4, 16, 32, 64, or 128. In some embodiments, the signal lines are strip lines or micro-strip lines disposed, at least partially, on a circuit board. In some embodiments, the signal lines are disposed, at least partially, in an SOC, multichip-module, or one or more cables. Further, in some embodiments, the bus 200 is a crosstalk harnessed encoding bus. For purposes of the present description, the signaling modules 120 are referred to herein as a transmitting module 202 and a receiving module 204. For the sake of clarity, the transmitting module 202 is shown as including the components used in transmitting, while the receiving module 204 is shown as including the components used in receiving. However, it will be appreciated that in some embodiments, each signaling module 120 will include components for both transmitting and receiving data through the data bus.

The transmitting module 202 includes one or more encoders 206 for encoding the data to be transmitted over the bus 200. The encoder 206 includes a number of digital inputs for receiving digitally encoded data from an electronic component (not shown). The digital inputs to the encoder are referred to in FIG. 2 as "Data A" through "Data N". The output of the encoder 206 is coupled to a plurality of transmitters 208, each of which receives a signal from the encoder 206 and transmits a corresponding voltage signal on its respective signal line. The encoder 206 encodes the data transmitted over the bus 200 in such a way that the negative effects of crosstalk are removed and signal quality is enhanced. In some cases, the encoding is performed on a nibble-by-nibble basis. The resulting waveforms that are driven onto the bus 200 consist of N voltage levels, where N is greater than 2. Thus, the resulting waveforms include more voltage levels than that of the traditional binary waveforms. For example, in the scenario where 4 signal lines are encoded, N=4 and 4 voltage levels may be driven on the bus.

The receiving module 204 includes receivers 210 coupled to each of the signal lines. Each receiver 210 receives the analog signal transmitted by the respective transmitter 208 of the transmitting module 202 and provides an input signal to a respective decoder 212. The decoder 212 decodes the data transmitted over the data bus 200 and transmits digital data to a receiving electronic component (not shown). Each decoder 212 of the receiving module 204 is paired with a respective encoder 206 of the transmitting module 202. The receivers 210 can decode the data by sampling the 4 voltage levels at the input to the receiver once per unit interval (UI) and uses a lookup table with properties dependent on the encoding matrix W to recover the binary bit stream.

As shown in FIG. 2, each encoder 206 can control four of the signal lines of the data bus 200. However, in some embodiments, each encoder 206 can control any suitable number of signal lines up to the total number of signal lines of the data bus 200. In some embodiments, such as the one shown in FIG. 2, the data bus 200 is divided between a number of encoder/decoder pairs. In some embodiments, the transmitting module includes a single encoder 206 and the receiving module includes a single decoder 212.

Throughout the present description, reference may be made to nodes which serve as reference points for explaining the present techniques. Specifically, node A refers to the output of the transmitters 208 of the transmitting module 202, node B refers to the input of the receivers 210 of the receiving module 204, and node C refers to the digital output of the decoder 212 at the receiving module 204.

As explained further below, the data inputs for a single encoder 206 (for example, Data A through Data D) are encoded such that the crosstalk from neighboring signal lines becomes a part of the signal transmitted over each signal line. In some embodiments, the encoder 206 uses an encoding matrix to generate the transmitted line voltages, so that the line voltage driven on a particular signal line is a weighted sum of all of the digital inputs to the encoder 206. The encoding adjusts the voltage waveform on each signal line such that, upon decode, the crosstalk from the neighboring lines becomes part of the signal on each respective signal line and is decoded into the original signal. In some embodiments, the decoder 212 decodes the received line voltages using decoding matrix that is the transpose or inverse of the encoding matrix. As an example, the four data encoded signal lines, Line 1 through Line 4 can be considered four conductors, with three balanced encoded conductors and one common mode conductor. The impact of having one conductor operating in the common mode is that this one conductor will have a lower maximum data rate when compared to the remaining conductors that have balanced encoding.

Figure 3:
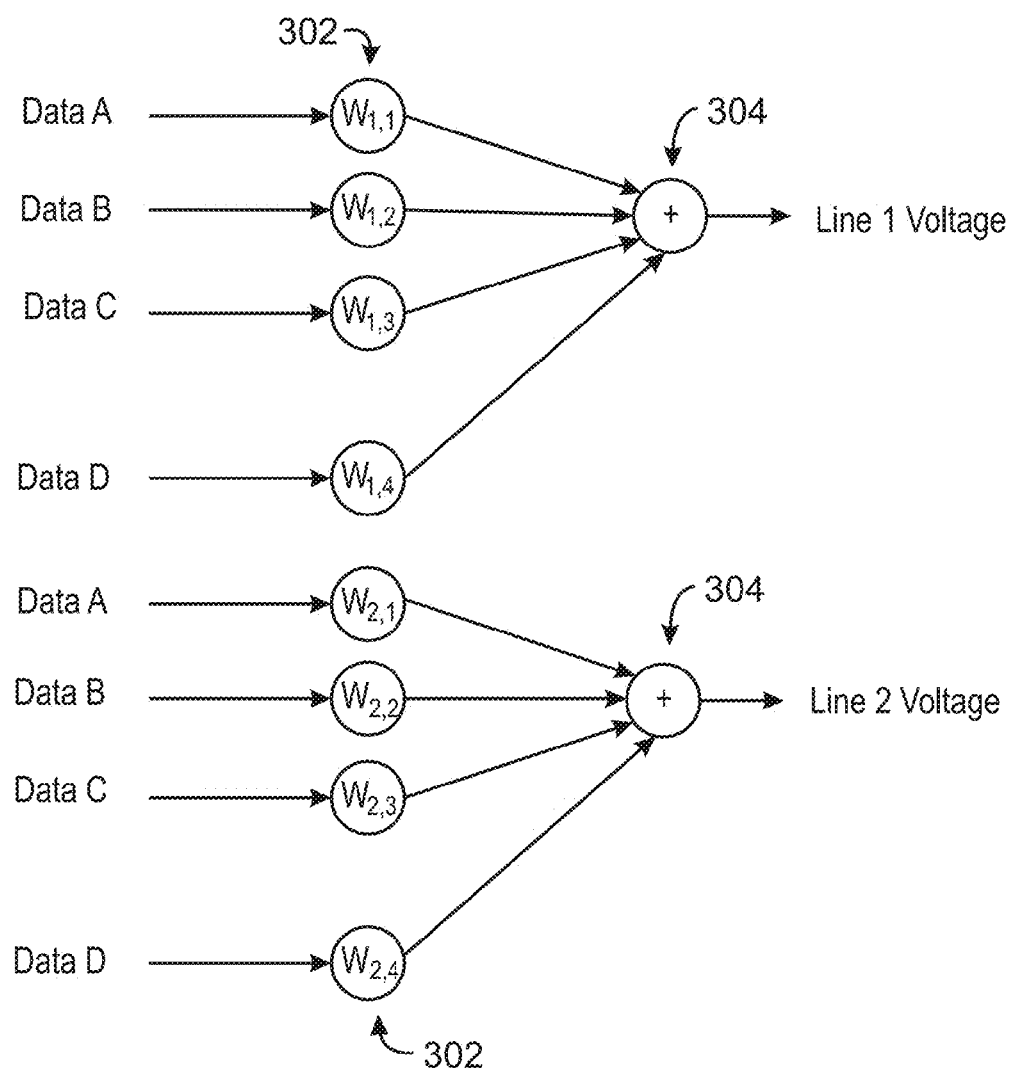
FIG. 3 is a mathematical representation of the encoding process used by a four-input encoder, such as one of the encoders of FIG. 2.

FIG. 3 is a mathematical representation of the encoding process used by a four-input encoder, such as one of the encoders 206 of FIG. 2. The diagram 300 of FIG. 2 shows a number of data inputs, Data A through Data D, which correspond with the four data inputs of the same name shown in FIG. 2. The diagram 300 of FIG. 2 also shows a number of output line voltages, referred to as Line 1 voltage and Line 2 voltage. Line 1 voltage represents the voltage driven on the signal line referred to as "Line 1" in FIG. 2, and Line 2 voltage represents the voltage driven on the signal line referred to as "Line 2" in FIG. 2. It will be appreciated that the four-input encoder will also include a Line 3 voltage and a Line 4 voltage (not shown).

As shown in FIG. 3, the encoder may include weighting logic and summing logic. Data A through Data D are the binary voltage levels (For example, 1's and 0's) at the input of the encoder. For each line voltage, the encoder weights each of the four data inputs, Data A through Data D, according to specified weighting parameters, $W_{ij}$, 302 and the weighted inputs are then added by a summer 304. The output of each summer 304 is used to control the transmitter to drive the corresponding line voltage. After encoding the input data, each of the line voltages will be proportional to the weighted sum of each of the data inputs coupled to the encoder.

As shown in FIG. 3, encoding is based on a weighted sum of input data information from the victim and aggressor lines. For purposes of the present description, the term "aggressor line" refers to the source of the crosstalk noise, and the term "victim line" refers to the receiver of the crosstalk noise. The encoding matrix is constructed such that the noise coupled from aggressor to victim lines becomes part of the signal thus removing the negative attributes of crosstalk. The input data information may either consist of the input binary data stream (logical ones and zeros) or their pre-driven voltage values. In this manner, the weighting parameters or weighting factors are dependent upon the number of conductors that have a sufficient amount of crosstalk that must be mitigated. The weights, $W_{ij}$, may be unique for each input and may be a unique set for each victim line considered. The subscripts i and j indicate victim line number and aggressor line number, respectively. The weighting parameters, $W_{ij}$, 302 may be specified according to a pre-defined weighting scheme, in relation to FIGS. 5A and 5B, each of which show the weighting parameters assembled into matrix form.

The process shown in FIG. 3 may be implemented in any suitable hardware, including logic circuits, one or more processors configured to execute computer-readable instructions, and the like. Furthermore, although FIG. 3 shows a diagram of a four-input encoder, the same technique may be used in an encoder with any suitable number data inputs.

Figure 4:
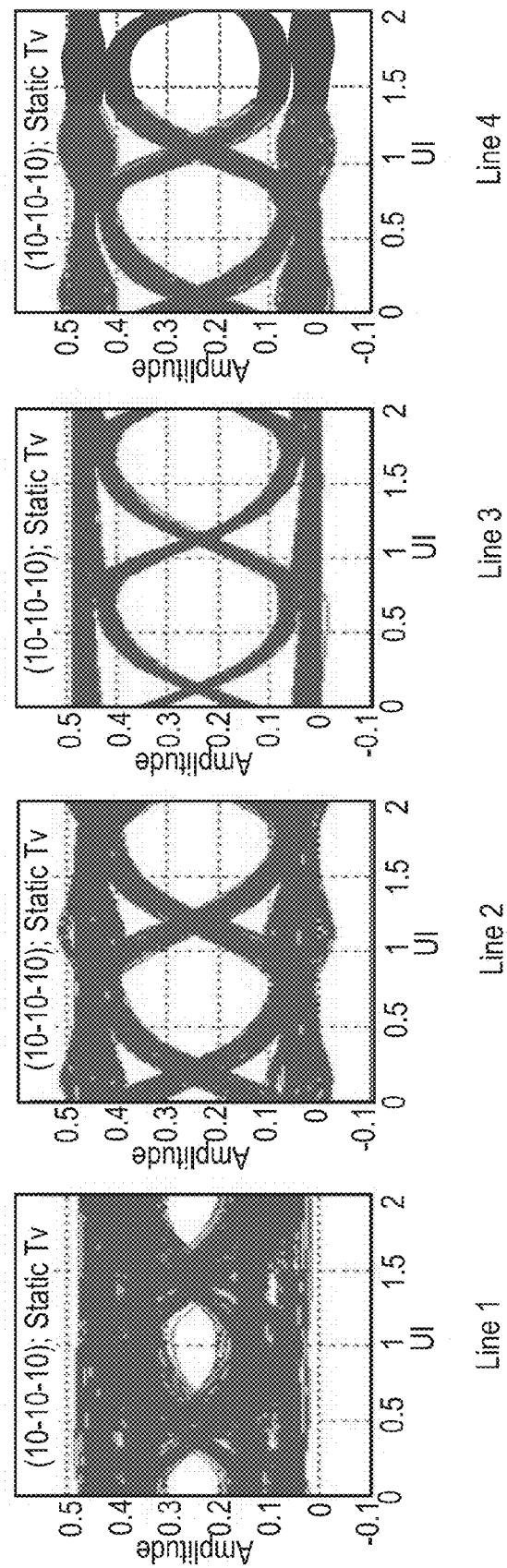
FIG. 4 is a diagram of four eye diagrams illustrating the common mode effect when four interconnects are encoded in a manner inhibited by a common mode interconnect.

FIG. 4 is a diagram of four eye diagrams 400 illustrating the common mode effect when four interconnects are encoded in a manner inhibited by a common mode interconnect. As used herein, each interconnect includes a conductor, where each conductor includes a signal line that carries a signal. In particular, an eye diagram for each of Line 1, Line 2, Line 3, and Line 4 is shown. An eye diagram, also referred to as an eye pattern, is a tool for evaluating the quality of a digital signal. An open eye pattern indicates a low level of signal distortion. Closure of the eye diagram indicates distortion of the waveform due to crosstalk and other factors. The x-axis of the eye diagram represents unit intervals (UI) while the y-axis represents amplitude.

Each of the four simulated eye diagrams 400 represent the signal quality of a long pseudo-random bit stream captured at the output of decoder 212 (FIG. 2, at Node C) at a data rate of 8 Gigatransfer per second (GT/s) bus with one inch long transmission lines and dense routing. As illustrated, Line 1 is a common mode interconnect that operates at a lower bandwidth when compared to the remaining three interconnects. At 8 Gigabits per second (Gb/s), the eye diagram for Line 1 is closed significantly due to crosstalk and other factors. If Line 2, Line 3, and Line 4 are forced to operate at a minimum frequency dictated by the common-mode interconnect Line 1, a large portion of bandwidth would go unused as illustrated by the eye diagrams corresponding to Line 2, Line 3, and Line 4 being more open when compared to Line 1. Moreover, a significant data rate performance increase would be unrealized.

In order to obtain a higher data throughput, Line 2, Line 3, and Line 4 are not limited by the low throughput of the common mode signal Line 1. In particular, an encoding matrix can be used to apply balanced encoding to lines other than the common-mode signal line, while utilizing the common-mode signal as a reduced data rate line. In some embodiments, the common-mode interconnect can be used for slower speed communication, such as sideband signals.

FIG. 5A is an encoding matrix 500, W, used by a four-input encoder. Although the encoding matrix 500 is described as a four-input encoding matrix, any number of inputs may be used. For example, the encoding matrix may be an N-input encoder, where N corresponds to the number of signal lines controlled by the encoder. The encoding matrix is a matrix of weighting parameters used to encode the digital data received by the encoder. The size of the encoding matrix will depend on the number of signal lines controlled by the encoder. The weighting parameters, $W_{ij}$, may be specified such the crosstalk between each of the signal lines controlled by the encoder will be reduced, while still ensuring that the digital data input to the encoder can be reproduced by a decoder.

The weighting parameters may be signed real numbers, complex numbers, or integers and are chosen such that crosstalk is minimized and voltage limits of the transmitter and receiver devices are not violated. Once data is transmitted across the channel, crosstalk is effectively removed from the signals and the binary data can be recovered. To minimize crosstalk, the weighting parameters may be specified according to specific rules. However, the weighting matrix is not limited by a lowest data rate of the common mode signal. Rather, the weights are applied such that the signal lines that have a balanced encoding from the encoding matrix can operate at a maximum data rate, while using the common-mode signal as a reduced data line. In some embodiments, the designated common-mode signal line can be used for slower speed communication, such as side band signals. The common mode signal corresponds to weighting factors with the same sign (either positive or negative) in the encoding matrix. The balanced encoded signals have weighting factors of the same magnitude in the encoding matrix.

FIG. 5B is a is an example of an encoding matrix for a four-input encoder. The first column of the encoding matrix corresponds to the common mode signal, as each value of this column has the same sign. In this case, each value corresponding to the common mode signal is positive. The values in the remaining columns are of equal magnitude with varying signs. The remaining columns represent the balanced encoding. Accordingly, the four interconnects represented by the encoding matrix 502 have three balanced encoded interconnects that have equal positive and negative weighting factors, and one common mode interconnect that has all positive or negative weighting factors. The four-input encoding matrix may be used in the four-input encoder 206 shown in FIG. 2 and represented in FIG. 3. It should be noted that the values that comprise the encoding matrix W can be any suitable value and do not need to be identical as shown in the example of FIG. 5B.

Figure 6:
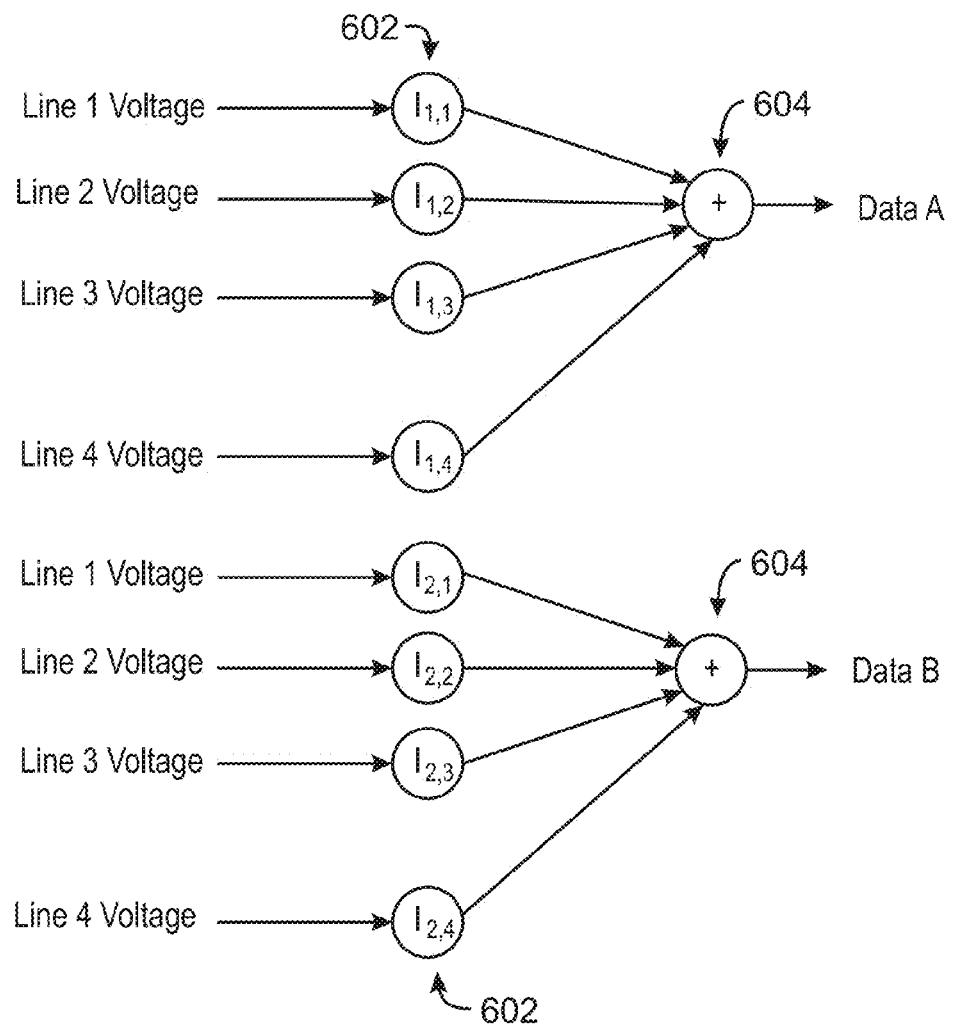
FIG. 6 is a diagram of a decoding process used by the decoder.

FIG. 6 is a diagram of a decoding process used by the decoder. Specifically, FIG. 6 is a mathematical representation of the decoding process used by the decoder 212 that is paired with the encoder 206 of FIGS. 2 and 3. The diagram 600 of FIG. 2 shows a number of line voltage inputs, Line 1 through Line 4, which correspond with the signal lines of the same name shown in FIG. 2. The diagram 600 of FIG. 6 also shows a number of data outputs, referred to as Data A and Data B. The Data A and Data B outputs represent the data outputs of the same name shown in FIG. 2. It will be appreciated that the four-output decoder of FIG. 6 will also include a Data C output and Data D output (not shown).

As shown in FIG. 6, the decoder may include weighting logic and summing logic. For each data output, the decoder weights each of the four line voltages received over the data bus, according to specified weighting parameters, Iij, 602 and the weighted line voltages are then added by a summer 604. The line voltages from each signal line are multiplied by corresponding weighting terms, $I_{i,j}$. The subscripts i and j indicate victim line number and aggressor line number, respectively. The output of each summer 604 is used to generate a corresponding digital data output. After decoding the line voltage data, each of the data outputs will be proportional to the weighted sum of each of the line voltages coupled to the decoder. The decoder output referred to as Data A is a digital signal that represents the digital data that was input to the corresponding encoder at the transmitting side of the data bus, which is also referred to as Data A in both FIGS. 2 and 3. The weighting parameters, $I_{ij}$, 602 may be specified according to a pre-defined weighting scheme, which is explained further below, in relation to FIGS. 7A and 7B.

The process shown in FIG. 6 may be implemented in any suitable hardware, including logic circuits, one or more processor configured to execute computer-readable instructions, and the like. Furthermore, although FIG. 6 shows a diagram of a four-output decoder, the same technique may be used in a decoder with any suitable number data outputs.

FIG. 7A is decoding matrix, I, used by an N-input encoder, where N corresponds to the number of signal lines coupled to the decoder. The decoding matrix is a matrix of weighting parameters used to decode the line voltages received by the decoder. The size of the encoding matrix will depend on the number of signal lines coupled to the decoder. To ensure that the digital data can be reproduced by the decoder, the weighting parameters, $I_{ij}$, may be specified such that the decoding matrix, I, is the transpose or inverse of the encoding matrix, W. The decoding process reverses the operations of the encoding process. After the decoding process, the encoded line voltages are converted back to binary voltages and the digital bit stream is recovered.

FIG. 7B is an example of a decoding matrix for a four-input decoder. The four-input decoding matrix is the inverse (and transpose for this particular case) of the encoding matrix shown in FIG. 5B, multiplied by a scaling factor of 0.25. In some cases, the inverse of the encoding matrix is equal to the transpose of the encoding matrix. However, this is not always the case when the decoding matrix is the inverse of the encoding matrix. Additionally, although a scaling factor of 0.25 is used in the present example, it will be appreciated that the decoding matrix can use any suitable scaling factor, depending on the design considerations of a particular implementation. The four-input decoding matrix may be used in the four-input decoder 206 shown in FIG. 2 and represented in FIG. 6.

Figure 8A:
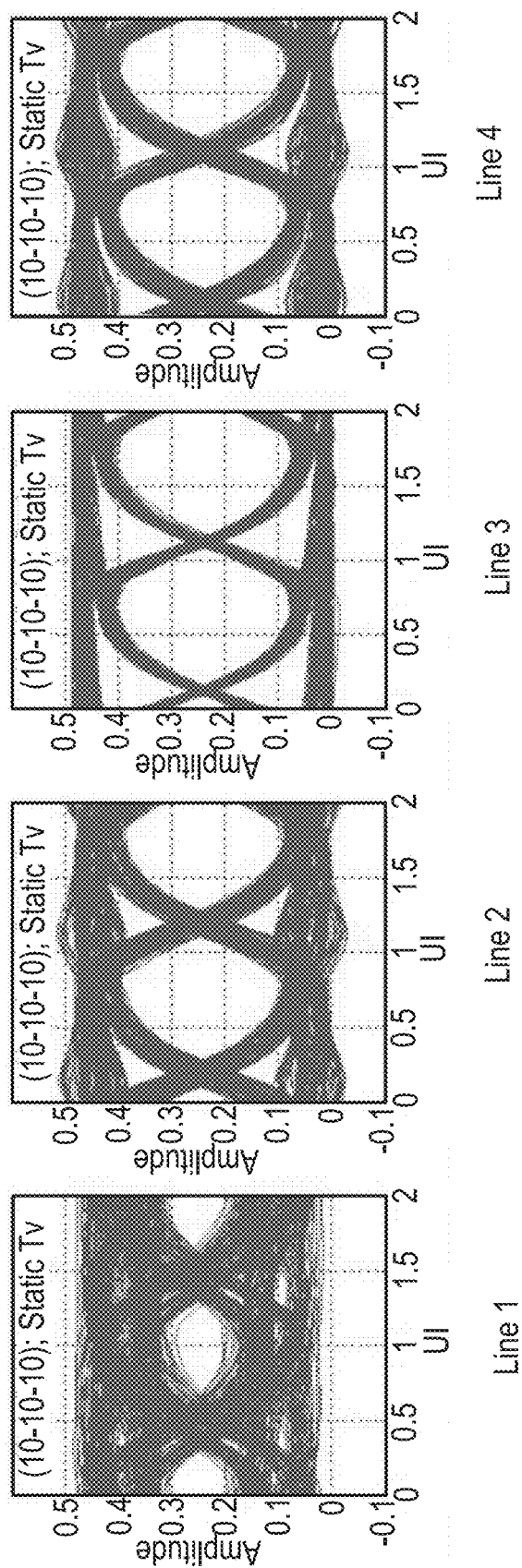
FIG. 8A is a diagram of four eye diagrams illustrating a common mode interconnect operating a maximum speed.

FIG. 8A is a diagram of four eye diagrams 800 illustrating a common mode interconnect operating at a maximum speed. In particular, Line 1 is operating at a common mode limit of 8 Gb/s. If a bus including Line 1, Line 2, Line 3, and Line 4 has all lines operate at the same data rate of 8 Gbps, the maximum bandwidth on that bus is 32 Gb/s. In some cases, a maximum data rate or a maximum bandwidth of the balanced encoded interconnect is a rate or bandwidth at which integrity of the transmitted data is maintained.

Figure 8B:
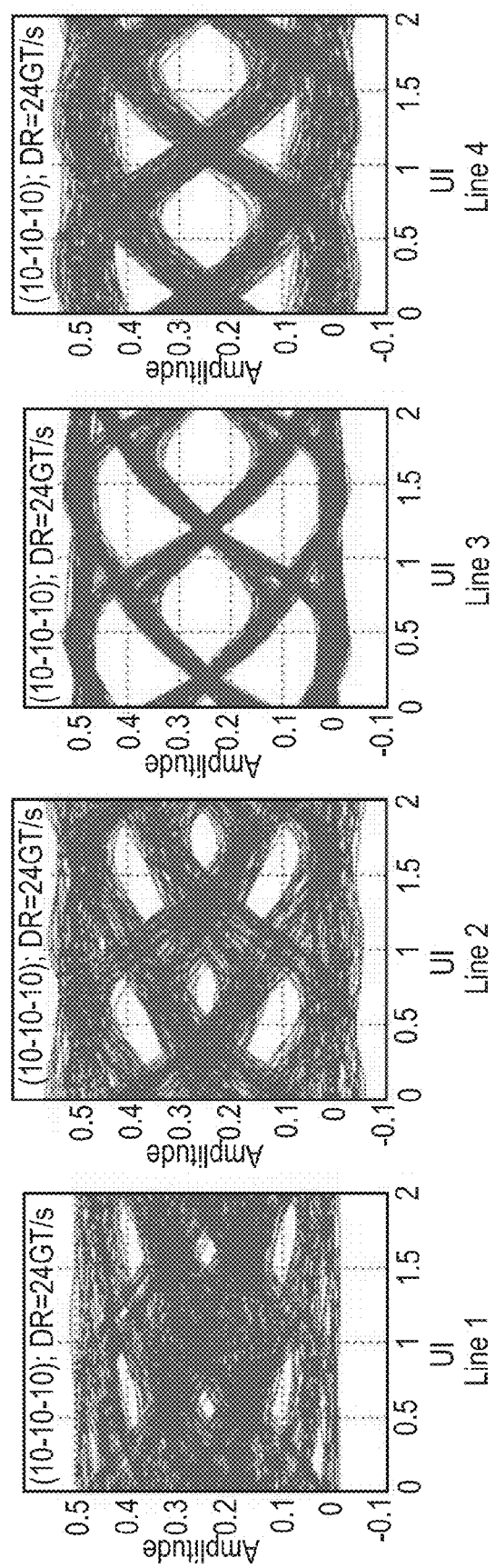
FIG. 8B is a diagram of four eye diagrams illustrating balanced encoded conductors.

FIG. 8B is a diagram of four eye diagrams 850 illustrating balanced encoded interconnects. In particular, Line 2, Line 3, and Line 4 are balanced encoded interconnects each capable of operating at 24 Gb/s. Even with the balanced encoded interconnects operating at 24 Gb/s, the eye of the common-mode Line 1 remains open and can transmit data at 8 Gb/s. This results in a total throughput of 80 Gb/s and an improvement of at 2.5 times more than operating without balanced encoded interconnects.

Figure 9:
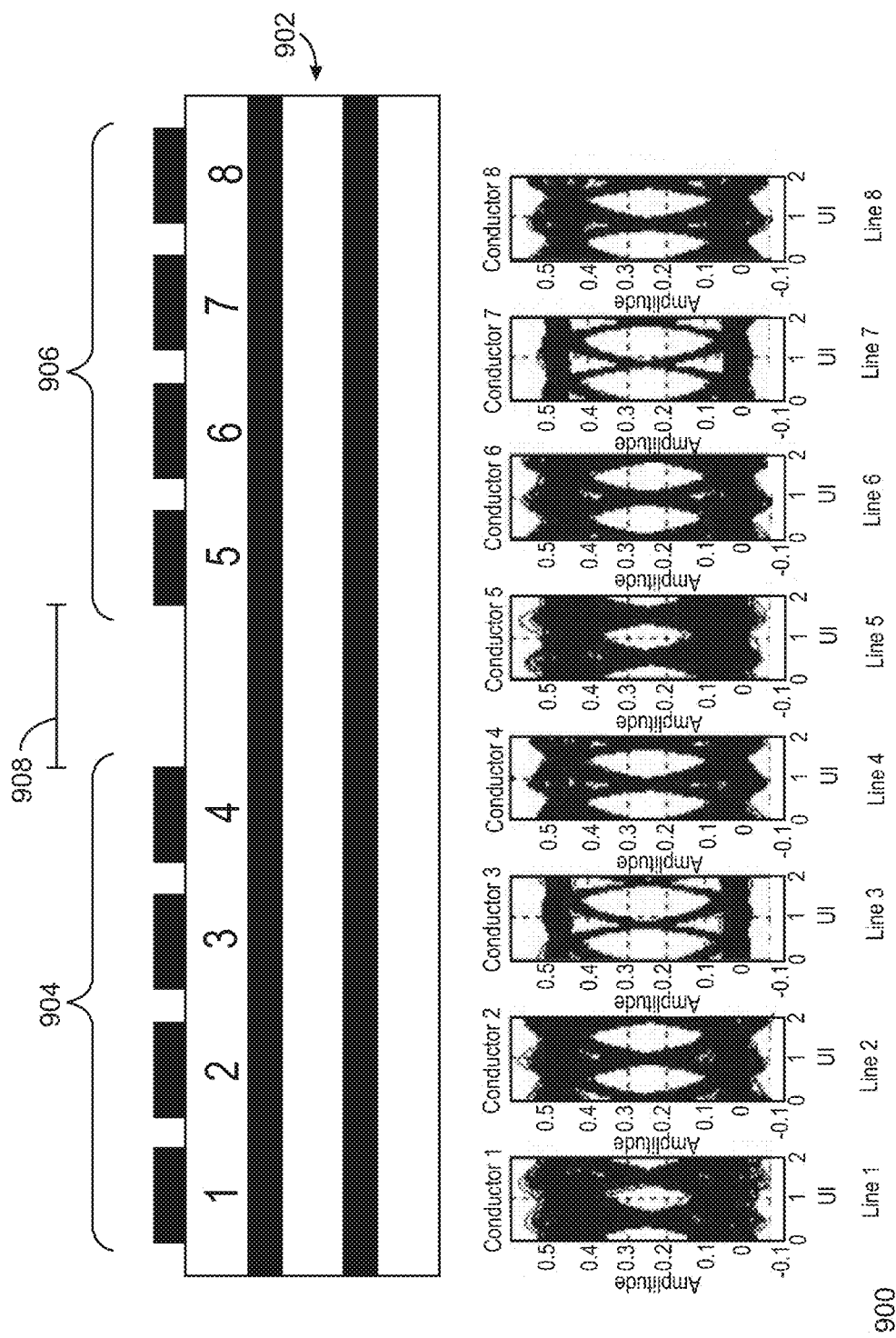
FIG. 9 is an illustration of wide nibble-to-nibble spacing.

In addition to a higher throughput on a single bus, the present techniques can be applied to a wide, densely routed bus. FIG. 9 is an illustration of wide nibble-to-nibble spacing. As used herein, a nibble is a grouping of signal lines that are to be encoded together as described above. Each nibble can have N signal lines, where N can be any suitable number, including but not limited to 2, 4, 16, 32, 64, or 128. In some embodiments, the signal lines are strip lines or micro-strip lines disposed, at least partially, on a circuit board. A circuit board 902 includes a first nibble 904 and a second nibble 906. Although a circuit board is described, the present techniques can be implemented on a cable, flexible printed circuit board, a connector, and the like. The first nibble 904 includes Line 1, Line 2, Line 3, and Line 4. The second nibble 906 includes Line 5, Line 6, Line 7, and Line 8. Further, the spacing between the first nibble 904 and the second nibble 906 is 24-mils. In sum, the first nibble 904 and the second nibble 906 can transfer a byte of data.

Each nibble of the byte has one interconnect that operates in the common mode. For purposes of this example, Line 1 of the first nibble 904 and Line 5 of the second nibble 906 are each common mode interconnects. Furthermore, for purposes of this example, the conductors in this example are 4 mils wide with a 4 mil space between Line 1, Line 2, Line 3, and Line 4. There is also 4 mils of spacing between Line 5, Line 6, Line 7, and Line 8, with and a wide spacing of 24 mils (six times the width between each Line of a nibble) between the first nibble 904 and the second nibble 906.

The corresponding eye diagrams illustrate the performance of each interconnect in the 8-bit crosstalk encoded bus with Line 1 and Line 5 operating in common-mode. At 8 Gb/s, the eyes are open for all interconnects for this simulation condition, with the eyes that correspond to the common mode signals being the most closed. FIG. 9 illustrates a severe density reduction due to the increased spacing between nibbles and limiting the data rate due to the common mode signals. However, density can be increased by adjusting throughput and full balanced encoding.

Figure 10:
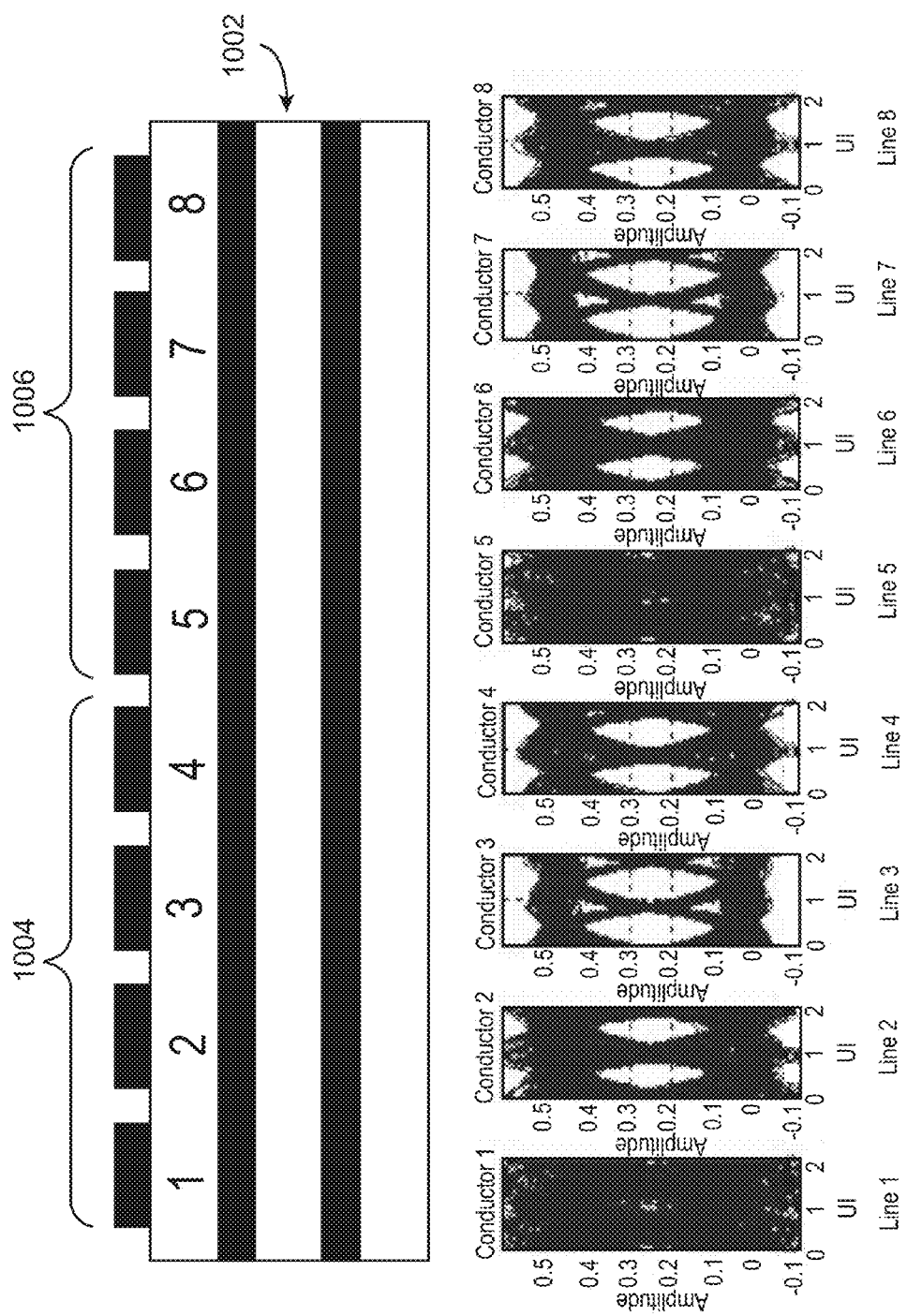
FIG. 10 is an illustration of narrow nibble-to-nibble spacing.

FIG. 10 is an illustration of narrow nibble-to-nibble spacing. Similar to FIG. 9, a circuit board 1002 includes a first nibble 1004 and a second nibble 1006. The first nibble 1004 includes Line 1, Line 2, Line 3, and Line 4. The second nibble 1006 includes Line 5, Line 6, Line 7, and Line 8. Further, the spacing between the first nibble 1004 and the second nibble 1006 is 4-mils.

Each nibble of the byte has one interconnect that operates in the common mode. For purposes of this example, Line 1 of the first nibble 1004 and Line 5 of the second nibble 1006 are each common mode conductors. Furthermore, for purposes of this example, the conductors in this example are 4 mils wide with a 4 mil space between Line 1, Line 2, Line 3, and Line 4. There is also 4 mils of spacing between Line 5, Line 6, Line 7, and Line 8, with and a narrow spacing of 4 mils (equal to the width between each Line of a nibble) between the first nibble 1004 and the second nibble 1006.

To increase density, the space between each nibble has been reduced. While this can increase the density of the bus, the common mode signals of Line 1 and Line 5 have closed eyes as illustrated by the corresponding eye diagrams in FIG. 10. The closed eyes are due to unwanted crosstalk between the nibbles. However, through balanced, selective encoding, the data rate can be reduced on the common mode conductors to open the eye while increasing the routing density. In some cases, the routing density is increased by 62%.

Figure 11:
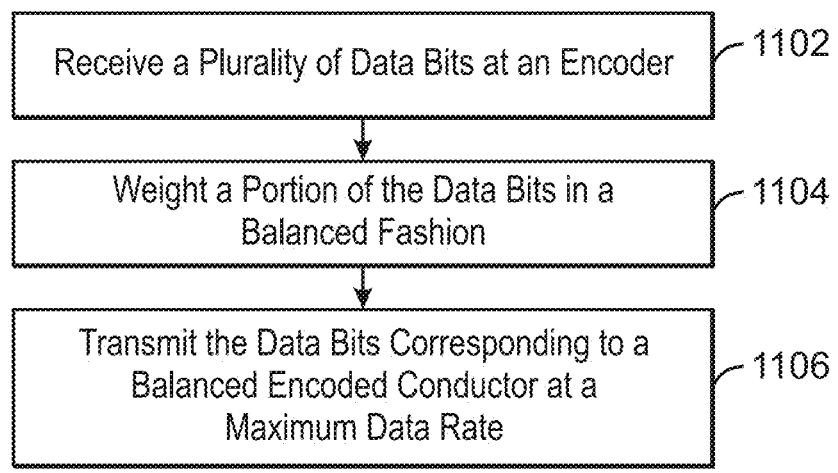
FIG. 11 is a process flow diagram summarizing a method for increasing a maximum bandwidth of an interconnect.

FIG. 11 is a process flow diagram summarizing a method for increasing a maximum bandwidth of a bus. The method 1100 can be performed by one or more signaling modules such the signaling modules shown in FIG. 1. The method 1100 may be implemented by logic included in the signaling module, for example, in the encoder 206 and decoder 212 shown in FIG. 2. The logic is embodied in hardware, such as logic circuitry or one or more processors configured to execute instructions stored in a non-transitory, computer-readable medium. The method may begin at block 1102, wherein a plurality of data bits is received by an encoder. The data bits are received in parallel, which means that each data bit is received at approximately the same time and each data bit corresponds to a different data stream.

At block 1104, a portion of the data bits are weighted in a balanced fashion. For example, the portion of the data bits corresponding to a balanced encoded interconnect are weighted by equal positive or negative weighting factors. The data bits corresponding to the common-mode interconnect are weighted by all positive or all negative weights. As discussed above, the encoding matrix may be a matrix wherein the dot product between any two columns of the encoding matrix is zero and the sum of squares for each column of the encoding matrix is non-zero. The values of the encoding matrix may cause the portion of the data bits to be weighted in a balanced fashion. At block 1106, the data bits corresponding to a balanced encoded interconnect are transmitted at a maximum data rate. The data bits corresponding to the common mode interconnect may be transmitted at a limited data rate. The limited data rate may be a lower speed than the balanced encoded signal lines. In some cases, the balanced encoded signal lines are to operate at a maximum bandwidth.

In embodiments, the weighted data can be summed. The summed, weighted data may be used to generate a signal level to be transmitted over a signal line. For example, the encoder can use the result of the summation to generate a control signal used to control a transmitter, such that the transmitted signal is proportional to a weighted sum of the each of the inputs to the encoder. The signal level is transmitted over the signal line, and the signal level can be transmitted in parallel for each signal line controlled by the encoder, such that each signal level generated will be generated using a different column of weighting parameters from the encoding matrix.

A plurality of signals may be received after being transmitted over a bus. The plurality of signals can be signals that were transmitted by an encoder following the process as described above. At a decoder, each of the plurality of signals may be multiplied by a weighting parameter to generate weighted data. The weighting parameters may be obtained from a decoding matrix that is the transpose of the encoding matrix used by the encoder. The weighted data may then be summed to generate a received data bit. The received data bit will have the same value as one of the data bits received by the encoder. Data from each signal line may be decoded in parallel. At the end of the process, each of the data bits received by the encoder will be reproduced by the decoder.

Additionally, the routing density of a bus that includes balanced encoded signals can overcome the undesirable effects of nibble to nibble crosstalk by enabling the common mode interconnect to run at a speed slow enough to have an open received eye. In other words, a routing density can be increased by decreasing the data speed of common mode interconnect on the common mode interconnect is intact when decoded at the decoder.

Figure 12:
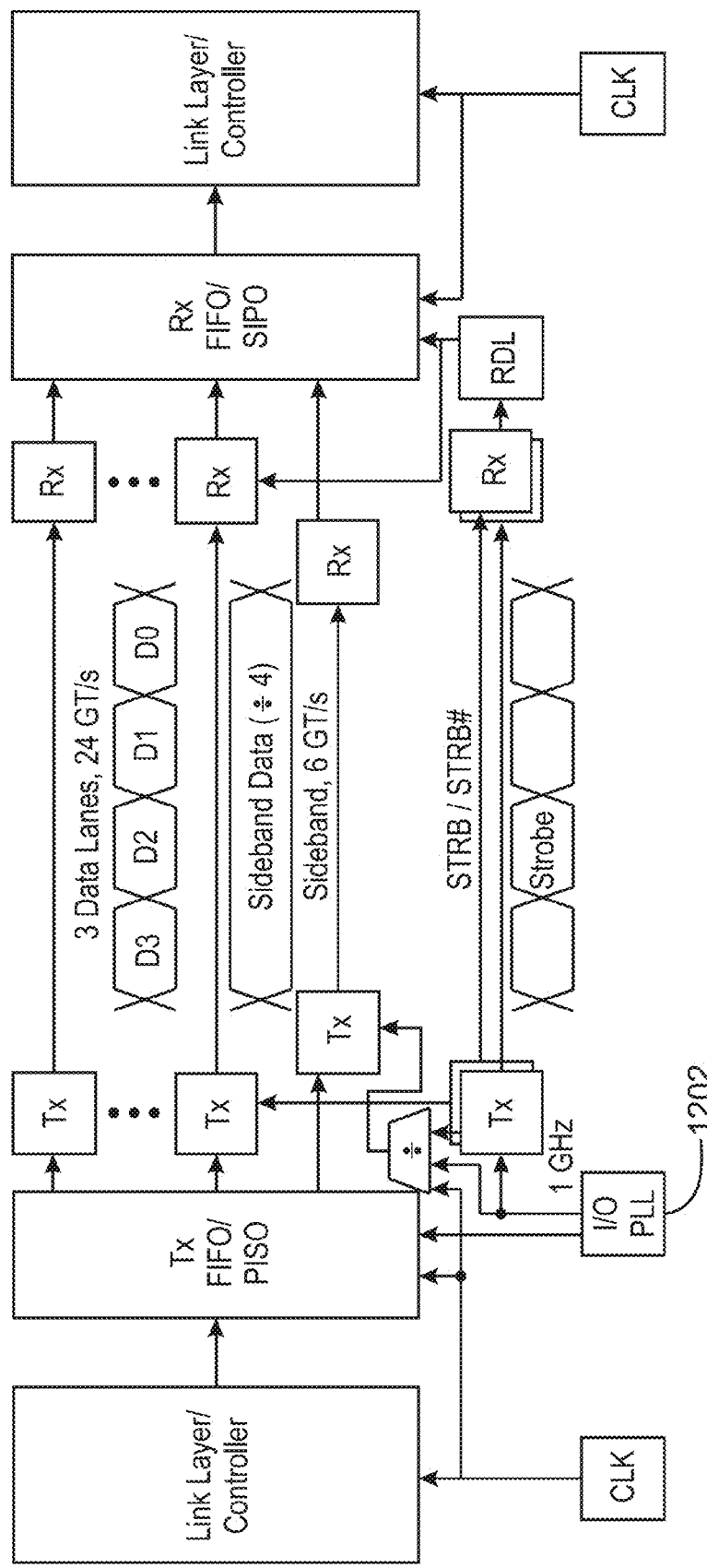
FIG. 12 is an illustration of a forwarded clock architecture according to the present techniques.

FIG. 12 is an illustration of a forwarded clock architecture 1200 according to the present techniques. The link clock source will be derived from an I/O PLL 1202 in the Analog Front End (AFE) of the PHY layer. Depending upon the data rates selected for the lower speed signal, a simple clock divider may provide adequate performance. If the interconnect needs a sideband signal for link initialization and control information, this solution will allow for the uncore clock to run the sideband in a low frequency mode.

Figure 13:
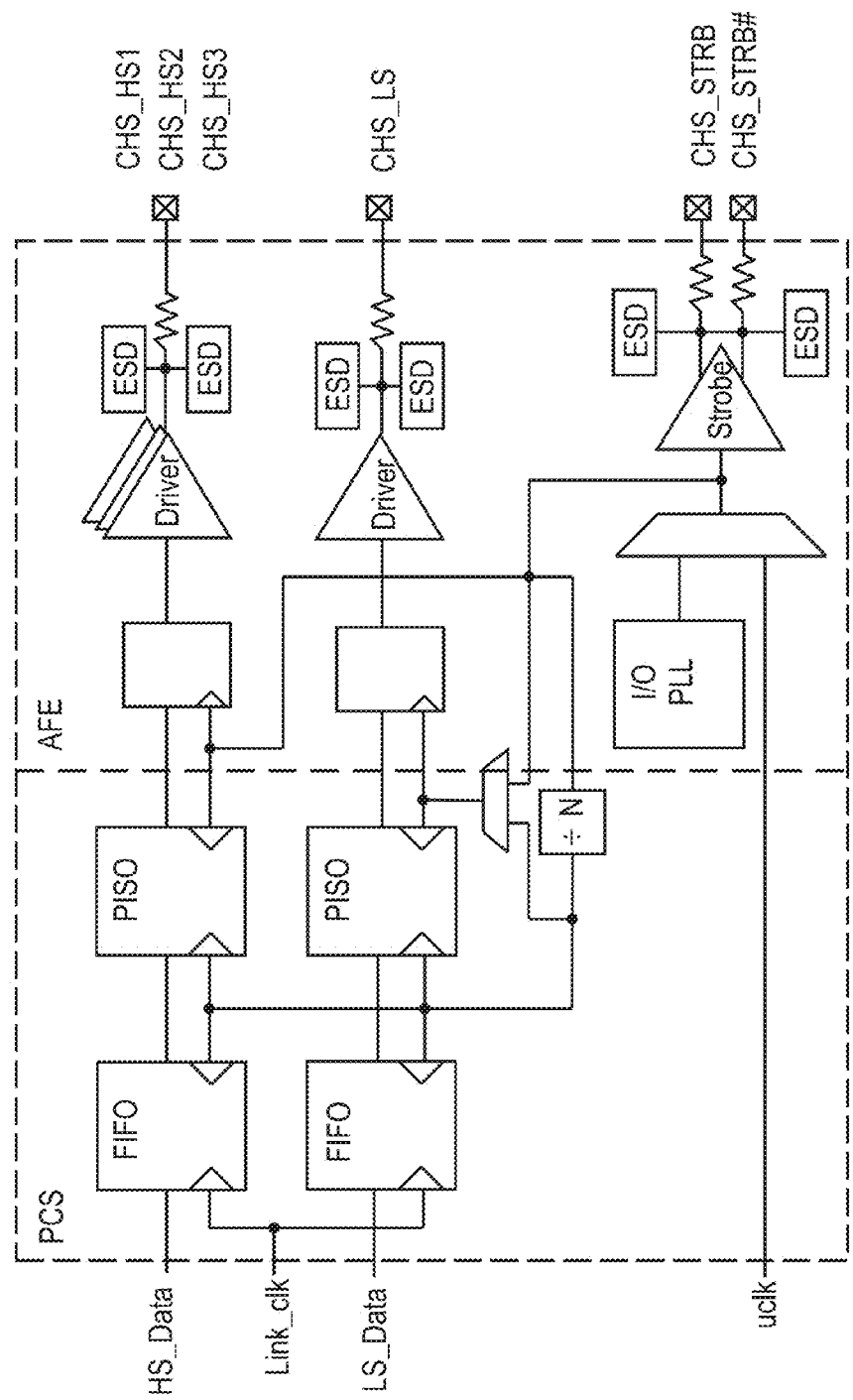
FIG. 13 is an example of a transmit physical layer.

FIG. 13 is an example of a transmit physical layer (PHY) 1300. For simplicity in the clocking, a clock ratio divider can be used to derive the clock for the low speed, common mode signals from the I/O PLL. To enable asynchronous communication for the sideband signal without waking the entire AFE, a multiplexer will allow the uncore clock (UCLK) to transmit slow speed signals such as wake/sleep handshaking. In this example, the level sharing may be done in a logic block between the PISO and the driver.

Figure 14:
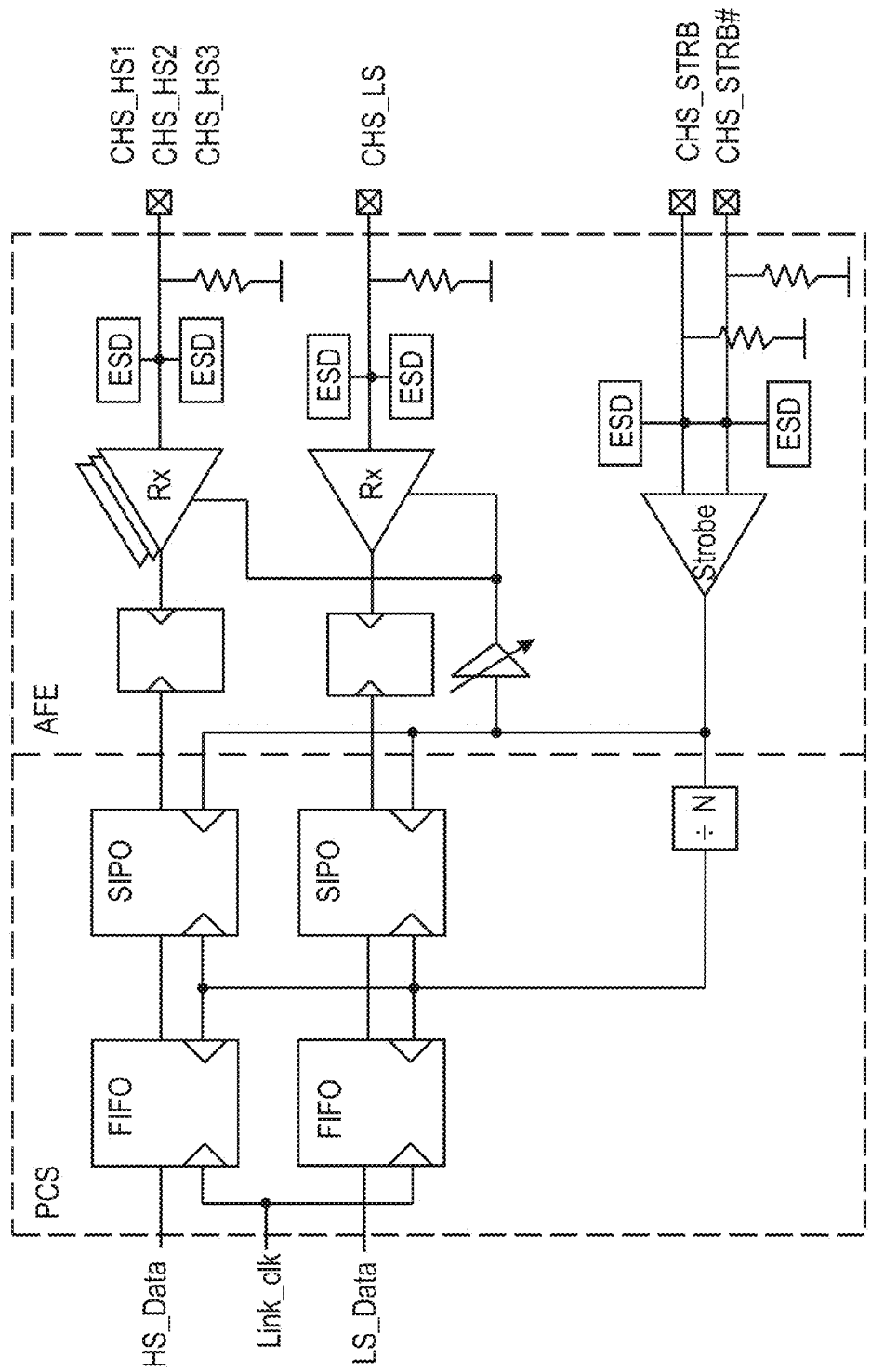
FIG. 14 is an example of a receiver physical layer.

FIG. 14 is an example of a receiver physical layer (PHY) 1400. On the decode side, the strobe sets the clocking for the receiver with delay lines to synchronize the group of four I/Os. Each receiver gets the same full speed clock to ensure that the received crosstalk from each high speed bit is sampled and can be recovered by the digital blocks after the receivers. In embodiments, an optional termination may be implemented at the receiver.

By dual purposing the low speed signal such as the common mode signal described above for sideband communication, a four wire nibble becomes a self-contained PHY interface for a serial input/output I/O application with a defined lane to pass power management and control information between two silicon die. While a clock-forwarded architecture has been described, the concept is applicable across common clock or even embedded clock architectures.

Example 1

An apparatus is described herein. The apparatus includes a plurality of conductors, wherein at least one conductor is a common-mode conductor. The apparatus also includes an encoder to encode data to be transmitted on the plurality of conductors, wherein a data speed of the common-mode conductor is limited and a data speed of other conductors is maximized according to an encoding matrix.

The other conductors may have a balanced encoding from the encoding matrix. The common-mode conductor may correspond to all positive or all negative weights in the encoding matrix. The common-mode conductor may be limited according to a routing density of the plurality of conductors. A nibble-to-nibble spacing of the plurality of conductors may be equal to spacing between each conductor of the plurality of conductors. The apparatus may include a signaling module, wherein the signaling module is coupled to a plurality of digital inputs. The signaling module may include components for transmitting and receiving data on a plurality of conductors. A total throughput of the apparatus may be at least 80 Gigabits per second. The plurality of conductors may be routed on packages, printed circuit boards (PCBs), multi-chip modules (MCMs), multi-chip packages (MCPs), or any combination thereof. Additionally, the plurality of conductors may be strip lines or micro-strip lines.

Example 2

An electronic device is described herein. The electronic device includes a bus with a plurality of signal lines, where at least one signal line is a common-mode signal line. The electronic device also includes an encoder to encode data to be transmitted on the bus, wherein a data speed of the common-mode signal line is limited and a data speed of other signal lines is maximized according to an encoding matrix.

The other signal lines may have a balanced encoding from the encoding matrix. The common-mode signal line may have all positive or all negative weighting factors in the encoding matrix. The other signal lines can have weighting factors of the same magnitude in the encoding matrix. The common-mode signal line may be limited according to a routing density of the plurality of signal lines. Additionally, a nibble-to-nibble spacing of the plurality of signal lines of the bus may be equal to spacing between each of the plurality of signal lines. A total throughput of the bus may be at least 80 Gigabits per second. The bus may be a wide, densely routed bus. Further, the weighting factors of the encoding matrix may be based on the amount of cross talk on each signal line. The electronic device may be a tablet PC, Ultrabook, desktop, or server. The electronic device can also be a mobile phone.

Example 3

A tangible, non-transitory, computer-readable medium is described herein. The tangible, non-transitory, computer-readable medium includes code to direct a processor to encode data received at the plurality of digital inputs using a weighted sum to generate balanced encoded data and common mode data. The tangible, non-transitory, computer-readable medium also includes code to direct a processor to transmit the balanced encoded data and common mode data on a plurality of conductors of an interconnect to maximize bandwidth of the balanced encoded data on the interconnect while limiting bandwidth of the common mode data on the interconnect.

The common mode data may be driven at a lower speed when compared to the balanced encoded data. A signaling module may be coupled to a plurality of digital inputs. A routing density of the interconnect may be increased, and in response to increasing the routing density, the signaling module reduces the bandwidth of the common mode data to maintain integrity of the common mode data. An encoder may encode the data, the encoder to weight the data received on each of the plurality of digital inputs based, at least in part, on an encoding matrix. Additionally, the signaling module may include a decoder coupled to a conductor of the interconnect, the decoder to couple to an encoder of a second signaling module through the conductor and decode data received from the encoder. The decoder may decode the signal data using a decoding matrix that is the transpose of an encoding matrix. The integrated circuit chip may be a central processing unit, micro controller, input/output hub, chipset, or memory controller hub (MCH) of a digital system. Additionally, the processor may be a graphics processor.

Example 4

An method to enable a mode selective balanced encoded interconnect, is described herein. The method includes receiving a plurality of data streams at the interconnect, and weighting each of the data streams with weighting parameters to generate weighted data streams using an encoding matrix, resulting in a balanced encoded data stream and a common mode data stream. The method also includes transmitting the balanced encoded data stream at a maximum data rate and the common mode data stream at a limited data rate.

The limited data rate of the common mode data stream may be based on a routing density of a bus. The maximum data rate of the balanced encoded data stream may be a data rate at which an integrity of the data stream is maintained. The balanced encoded data stream may be transmitted using a maximum bandwidth of a conductor of the interconnect. The method can also include receiving the balanced encoded data stream and the common mode data stream, and decoding the balanced encoded data stream and the common mode data stream.

Additionally, weighting parameters may be obtained for a decoding matrix that is a transpose or inverse of the weight parameters of the encoding matrix. The encoding matrix may include all positive or all negative weighting parameters for the common mode data stream. Further, the encoding matrix may include weighting parameters of the same magnitude for the balanced encoded data stream. The interconnect may be a densely routed interconnect. The interconnect may also include a signaling module.

Example 5

A system is described herein. The system includes a bus with a plurality of densely routed signal lines. The system also includes a first transmitting module coupled to a plurality of digital inputs, the first transmitting module to encode data received at the plurality of digital inputs, where the encoded data is balanced encoded data or common mode data, and the balanced encoded data is transmitted at a maximum data rate.

The common mode data may be transmitted at a limited data rate depending on the plurality of densely routed signal lines. The first transmitting module may include an encoder to encode the data, the encoder to weight the data received on each of the plurality of digital inputs based, at least in part, on an encoding matrix. The encoding matrix can include weighting factors of equal magnitude to be applied to the balanced encoded data. The encoding matrix may also include weighting factors of all positive values or all negative values to be applied to the common mode data. A decoder may be coupled to the plurality of densely routed signal lines of the bus, the decoder to decode the balanced encoded data or and the common mode data received over the bus using a decoding matrix that is the transpose or inverse of the encoding matrix.

Example 6

An apparatus is described herein. The apparatus includes a plurality of conductors. The apparatus also includes a means to encode data received at a plurality of digital inputs, wherein the encoded data is transmitted on the plurality of conductors and a data speed of a common-mode conductor is limited and a data speed of a balanced encoded conductor is maximized according to an encoding matrix.

The means to encode data received at a plurality of digital inputs may be a signaling module. The common-mode conductor may correspond to all positive or all negative weights in the encoding matrix. Additionally, the common-mode conductor may be limited according to a routing density of the plurality of conductors. A nibble-to-nibble spacing of the plurality of conductors is may be equal to spacing between each conductor of the plurality of conductors. The signaling module may include components for transmitting and receiving data on the plurality of conductors. A total throughput of the plurality of conductors is at least 80 Gigabits per second. The plurality of conductors may be routed on packages, printed circuit boards (PCBs), multi-chip modules (MCMs), multi-chip packages (MCPs), or any combination thereof. Additionally, the plurality of conductors may be strip lines or micro-strip lines.

While the present techniques have been described with respect to a limited number of embodiments, those skilled in the art will appreciate numerous modifications and variations therefrom. It is intended that the appended claims cover all such modifications and variations as fall within the true spirit and scope of this present techniques.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present techniques. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus, comprising:
a plurality of conductors, wherein at least one conductor is a common-mode conductor that is to transmit common mode signals from a plurality of data inputs to be encoded via an encoding matrix onto the at least one conductor, wherein the common-mode conductor corresponds to all positive or all negative weights in the encoding matrix;
an encoder to encode data to be transmitted on the plurality of conductors, wherein a data speed of the common-mode conductor is to be limited and a data speed of other conductors is to be maximized according to the encoding matrix, wherein the other conductors have a balanced encoding in the encoding matrix.

2. The apparatus of claim 1, wherein the other conductors have the balanced encoding from the encoding matrix via a weighted sum.

3. The apparatus of claim 1, wherein the common-mode conductor is limited according to a routing density of the plurality of conductors.

4. The apparatus of claim 1, wherein a nibble-to-nibble spacing of the plurality of conductors is equal to spacing between each conductor of the plurality of conductors.

5. The apparatus of claim 1, comprising a signaling module, wherein the signaling module is coupled to a plurality of digital inputs.

6. The apparatus of claim 1, wherein the plurality of conductors are routed on packages, printed circuit boards (PCBs), multi-chip modules (MCMs), multi-chip packages (MCPs), or any combination thereof.

7. An electronic device, comprising:
a bus comprising a plurality of signal lines, where at least one signal line is a common-mode signal line that is to transmit common mode signals from a plurality of data inputs to be encoded onto the at least one signal line;
an encoder to encode data to be transmitted on the bus, wherein a data speed of the common-mode signal line is limited and a data speed of other signal lines is maximized according to an encoding matrix with a first column of the same sign corresponding to the common mode signal line and remaining values of equal magnitude with varying signs.

8. The electronic device of claim 7, wherein the other signal lines have a balanced encoding from the encoding matrix via a weighted sum.

9. The electronic device of claim 7, wherein the common-mode signal line has all positive or all negative weighting factors in the encoding matrix.

10. The electronic device of claim 7, wherein the other signal lines have weighting factors of the same magnitude in the encoding matrix.

11. The electronic device of claim 7, wherein the common-mode signal line is limited according to a routing density of the plurality of signal lines.

12. The electronic device of claim 7, wherein a nibble-to-nibble spacing of the plurality of signal lines of the bus is equal to spacing between each of the plurality of signal lines.

13. A tangible, non-transitory, computer-readable medium comprising code to direct a processor to:
encode data received at the plurality of digital inputs using a weighted sum to generate balanced encoded data and common mode data wherein the common mode data is encoded onto a single conductor via an encoding matrix with a first column of the same sign corresponding to the common mode signal line and remaining values of equal magnitude with varying signs; and
transmit the balanced encoded data and common mode data on a plurality of conductors of an interconnect to maximize bandwidth of the balanced encoded data on the interconnect while limiting bandwidth of the common mode data on the interconnect.

14. The tangible, non-transitory, computer-readable medium of claim 13, wherein the common mode data is driven at a lower speed when compared to the balanced encoded data.

15. The tangible, non-transitory, computer-readable medium of claim 13, further comprising a signaling module coupled to a plurality of digital inputs.

16. The tangible, non-transitory, computer-readable medium of claim 13, wherein a routing density of the interconnect is increased, and in response to increasing the routing density, the signaling module reduces the bandwidth of the common mode data to maintain integrity of the common mode data.

17. The tangible, non-transitory, computer-readable medium of claim 13, comprising an encoder to encode the data, the encoder to weight the data received on each of the plurality of digital inputs based, at least in part, on an encoding matrix.

18. The tangible, non-transitory, computer-readable medium of claim 13, wherein the signaling module comprises a decoder coupled to a conductor of the interconnect, the decoder to couple to an encoder of a second signaling module through the conductor and decode data received from the encoder.

19. A method to enable a mode selective balanced encoded interconnect, comprising:
receiving a plurality of data streams at the interconnect;
weighting each of the data streams with weighting parameters to generate weighted data streams using an encoding matrix with a first column of the same sign corresponding to the common mode signal line and remaining values of equal magnitude with varying signs, resulting in a balanced encoded data stream and a common mode data stream; and
transmitting the balanced encoded data stream at a maximum data rate and the common mode data stream at a limited data rate, wherein the common mode data is encoded onto a single conductor.

20. The method of claim 19, wherein the limited data rate of the common mode data stream is based on a routing density of a bus.

21. The method of claim 19, wherein the maximum data rate of the balanced encoded data stream is a data rate at which an integrity of the data stream is maintained.

22. The method of claim 19, wherein the balanced encoded data stream is transmitted using a maximum bandwidth of a conductor of the interconnect.

23. The method of claim 19, comprising:
receiving the balanced encoded data stream and the common mode data stream; and
decoding the balanced encoded data stream and the common mode data stream.

24. The method of claim 19, comprising obtaining weighting parameters for a decoding matrix that is a transpose or inverse of the weight parameters of the encoding matrix.

* * * * *